United States Patent
Raja

(10) Patent No.: US 11,702,122 B2
(45) Date of Patent: Jul. 18, 2023

(54) WALKING AID VEHICLE

(71) Applicant: SUZUKI MOTOR CORPORATION, Hamamatsu (JP)

(72) Inventor: Gopinath Raja, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 282 days.

(21) Appl. No.: 16/951,735

(22) Filed: Nov. 18, 2020

(65) Prior Publication Data

US 2021/0155278 A1    May 27, 2021

(30) Foreign Application Priority Data

Nov. 22, 2019  (JP) .................... 2019-211389

(51) Int. Cl.
*A61H 3/04* (2006.01)
*B62B 5/00* (2006.01)

(52) U.S. Cl.
CPC .......... *B62B 5/0073* (2013.01); *A61H 3/04* (2013.01); *B62B 5/0036* (2013.01); *A61H 2003/043* (2013.01); *A61H 2003/046* (2013.01); *A61H 2201/1207* (2013.01); *A61H 2201/1635* (2013.01); *A61H 2201/5061* (2013.01); *A61H 2201/5069* (2013.01)

(58) Field of Classification Search
CPC ....... B62B 5/0073; B62B 5/0036; A61H 3/04; A61H 5/0036; A61H 1/00; A61H 2003/043; A61H 2003/046; A61H 2003/002; A61H 2201/1207; A61H 2201/1635; A61H 2201/5061; A61H 2201/1633; A61H 2201/5071
See application file for complete search history.

(56) References Cited

U.S. PATENT DOCUMENTS

| | | | | |
|---|---|---|---|---|
| 5,746,282 | A * | 5/1998 | Fujiwara | B60L 15/2009 180/6.5 |
| 9,433,552 | B2 * | 9/2016 | Chang | A61G 5/04 |
| 9,650,061 | B2 * | 5/2017 | Katayama | G08C 17/02 |
| 9,861,549 | B2 * | 1/2018 | Karlovich | A63B 22/02 |
| 10,052,253 | B2 * | 8/2018 | Shirato | A61H 3/04 |
| 11,439,566 | B2 * | 9/2022 | Kanaya | A63B 23/03516 |

(Continued)

FOREIGN PATENT DOCUMENTS

JP          2017-012546          1/2017

*Primary Examiner* — Steve Clemmons
(74) *Attorney, Agent, or Firm* — Cozen O'Connor

(57) ABSTRACT

A walking aid vehicle (1) includes: an operation part (3) provided on an upper portion of a vehicle body for grasping by a user in a walking posture; a detector (30) for detecting an operation force applied to the operation part; and an inclination detector (20) for detecting inclination of the vehicle body. When an advance direction inclination detected by the detector is less than threshold, a normal control (100) generates a normal direction torque in the drive motor (40L, 40R) responsive to pushing the operation part (3) forward and generates a reverse direction torque in the drive motor responsive to pulling the operation part rearward, and when the advance direction inclination is equal to or greater than threshold and pushing operation force is detected, a shift to a pull control (110) is made which generates normal direction torque in the drive motor responsive to a pulling operation force.

12 Claims, 10 Drawing Sheets

(56) References Cited

U.S. PATENT DOCUMENTS

| | | | |
|---|---|---|---|
| 11,446,201 B2* | 9/2022 | Shibata | A63B 21/023 |
| 11,452,662 B2* | 9/2022 | Kanaya | A63B 23/03516 |
| 2017/0001656 A1 | 1/2017 | Katayama et al. | |
| 2017/0326019 A1* | 11/2017 | Bramsiepe | B62B 5/064 |
| 2021/0149402 A1* | 5/2021 | Wu | G05D 1/021 |

* cited by examiner

WALKING AID VEHICLE

FIELD OF THE INVENTION

The present invention relates to a walking aid vehicle.

BACKGROUND OF THE INVENTION

Cart-type walking aid vehicles for users with a burden in walking, such as elderly people, have been developed. For example, JP 2017-012546 A discloses a walking aid vehicle that detects a torque applied to a wheel drive when a pedestrian pushes a handle and generates a driving torque or a braking force in accordance with an advance direction and an inclination angle of the vehicle.

Since such a walking aid vehicle detects a torque caused when a user pushes a handle and controls a driving force accordingly, smooth assistance of an electric motor cannot be disadvantageously obtained, for example, if a force for pushing the handle is not sufficient in climbing a slope.

SUMMARY OF THE INVENTION

The present invention has been made in view of the said point of a conventional technology and an object of which is to provide a walking aid vehicle allowed to exhibit, on an upslope, an operability suitable for conditions thereof.

To solve the problem, a walking aid vehicle according to the present invention includes:

a vehicle body having a forward-backward direction and a width direction;

driving wheels being driven by a drive motor mounted on the vehicle body;

trailing wheels provided away from the driving wheels in the forward-backward direction of the vehicle body;

an operation part provided on an upper portion of the vehicle body to be grasped by a user in a walking posture;

means for detecting an operation force applied to the operation part; and inclination detection means for detecting an inclination of the vehicle body, in which when an advance direction inclination detected by the inclination detection means is less than a threshold, a normal control is performed, the normal control generating a normal direction torque in the drive motor responsive to an operation of pushing the operation part forward and generating a reverse direction torque in the drive motor responsive to an operation of pulling the operation part rearward, and when the advance direction inclination detected by the inclination detection means is equal to or greater than the threshold and the operation of pushing the operation part forward is detected, a shift to a pull control is made, the pull control generating the normal direction torque in the drive motor responsive to an operation force for pulling the operation part.

As described above, in a walking aid vehicle according to the present invention, when, on an upslope with an advance direction inclination equal to or greater than a threshold, an operation of pushing an operation part forward is detected, that is, an intention of a user to climb the slope is confirmed, a shift to a pull control, which generates a normal direction torque in a drive motor responsive to an operation force for pulling the operation part, is made, and thus, a drag force generated in the operation part with a forward movement of the walking aid vehicle is determined to be an operation of dragging the user to continue slope climbing instead of being determined to be a retreating operation during the normal control, thereby enabling assisting upslope walking of the user.

DETAILED DESCRIPTION OF THE DRAWINGS

A detailed description is given below on an embodiment of the present invention with reference to the drawings.

Figure 1:
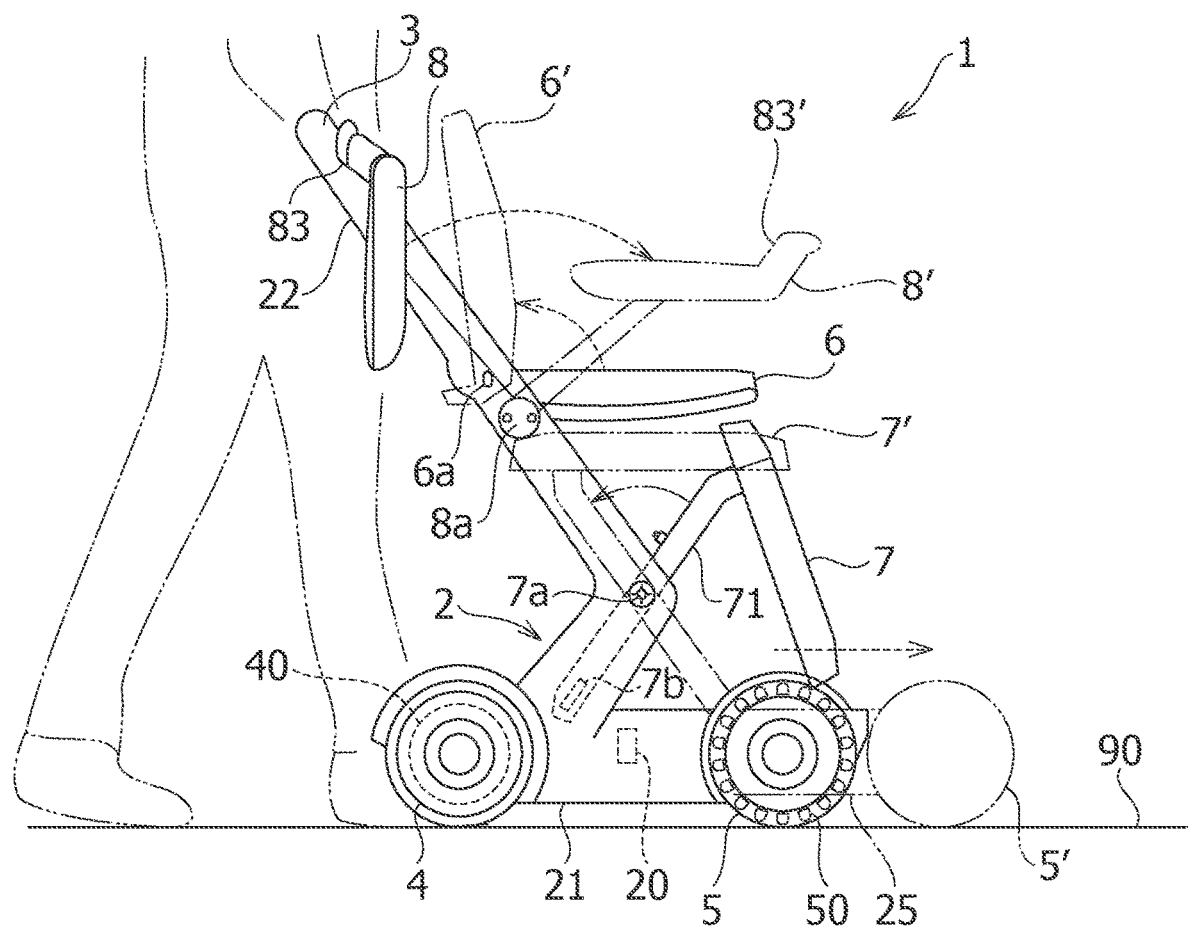
FIG. 1 is a side view showing a walking aid vehicle.

In FIG. 1, a walking aid vehicle 1 according to the embodiment of the present invention includes a vehicle body 2 including a lower frame 21 in which a battery is mounted and an upper frame 22 disposed upright therebehind, the upper frame 22 provided with an operation part 3 at an upper end thereof, the lower frame 21 provided with right and left driving wheels 4 at a rear end thereof and right and left trailing wheels 5 at a front end thereof.

The right and left driving wheels 4 are independently driven by right and left drive motors 40L, 40R (electric motors) mounted in the lower frame 21. The right and left trailing wheels 5 each include an omni wheel (omnidirectional wheel) including a great number of rollers 50 rotatable around an axis circumferential with respect to a grounded portion and steering and braking/driving operations of the walking aid vehicle 1 are made possible simply by controlling the drive motors 40L, 40R with the right and left grips 32 of the later-described operation part 3.

The walking aid vehicle 1 of the embodiment has a walking aid vehicle mode shown by solid lines in the figure and a compact electric vehicle mode shown by chain double-dashed lines in the figure.

The lower frame 21 includes a front portion 25, which is provided with the trailing wheels 5, configured to be extendable and retractable in a front and back direction with respect to a rear portion (main body) provided with the driving wheels 4 and the upper frame 22. Meanwhile, a lower end portion (6a) of a seat back 6, a leg portion 71 (7a) of a seat cushion 7, and a base (8a) of an armrest 8 are pivotally supported by the upper frame 22 via shafts 6a, 7a, 8a, which are all parallel with a vehicle width direction, and a lower end of the leg portion 71 is coupled to the front portion 25 via a coupling portion 7b.

The said configuration causes the front portion 25 of the lower frame 21 to extend forward when the seat back 6 is put upright to a seated position 6' and the seat cushion 7 is rotated rearward to a seated position 7' as shown by the chain double-dashed lines in the figure from the walking aid vehicle mode shown by the solid lines in the figure and, with the armrest 8 put down forward, the compact electric vehicle mode is enabled, in which automatic travel is made possible by operating a second operation part 83 while a user is seated. Further, in the walking aid vehicle mode shown by the solid lines in FIG. 1, an upper surface (rear surface) of the seat back 6, which is put down forward, serves as a loading space for baggage.

Figure 2:
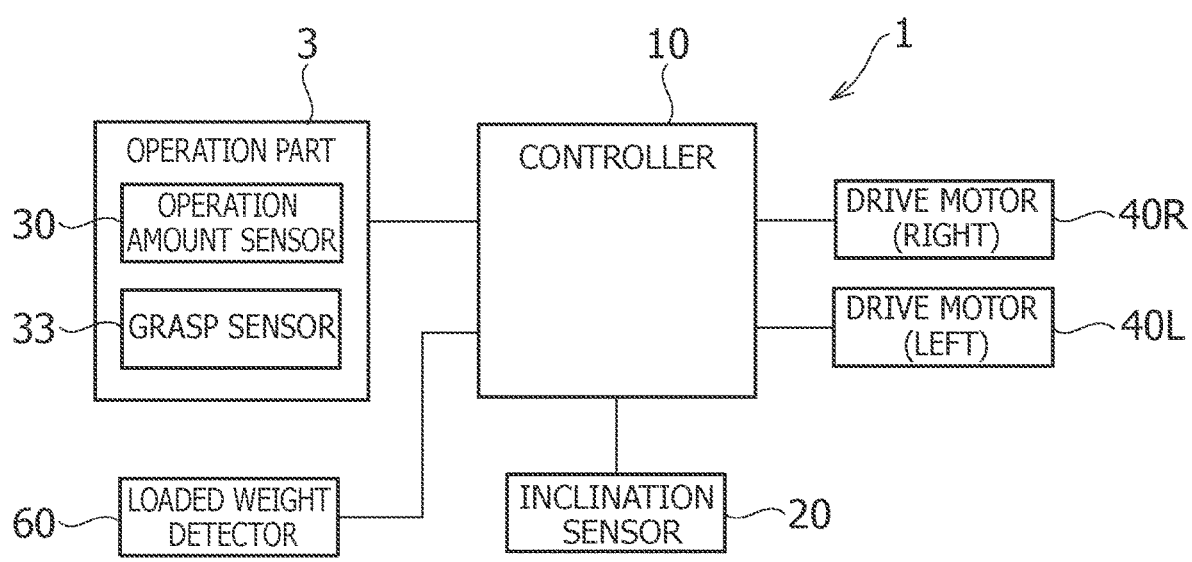
FIG. 2 is a block diagram showing a control system of the walking aid vehicle.

FIG. 2 is a block diagram showing a control system of the walking aid vehicle 1 and a controller 10, to which an input signal from the operation part 3 (operation amount sensor 30, grasp sensor 33) and a detection value of each of an inclination sensor 20 and a loaded weight detector 60 are input, is configured to determine a control amount of each of the right and left drive motors 40L, 40R with consideration for them.

Figure 3A:
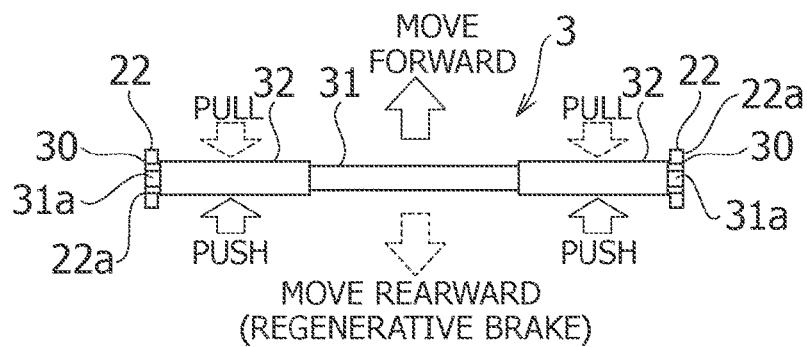
FIG. 3A is a plan view of an operation part showing an advancing and retreating operation according to a normal control of the walking aid vehicle.

FIG. 3A to 3E shows a configuration and an operation method of the operation part 3 in the walking aid vehicle mode of the walking aid vehicle 1. As shown in FIG. 3A, the operation part 3 includes a handle bar 31 extending in the vehicle width direction, respective grips 32 disposed on right and left sides of it, respective support bodies 31a supporting right and left end portions of the handle bar 31 while penetrating support holes 22a of the upper frame 22, and respective operation amount sensors 30 interposed between the support bodies 31a on the right and left sides and the support holes 22a.

The operation amount sensors 30 detect forces of a user for pushing forward and pulling rearward the right and left grips 32 as operation amounts (pressure or displacement), and a pressure sensor, a load sensor such as a piezoelectric device, a displacement sensor combined with an elastic member such as a spring are usable.

Figure 3B:
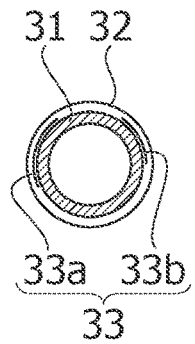
FIG. 3B is a cross-sectional view of a grip.
Figure 3C:
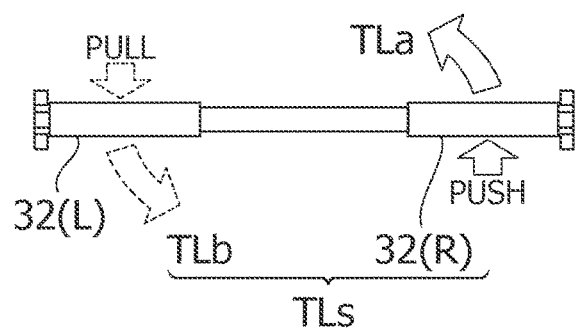
FIG. 3C is a plan view of the operation part showing a left-turn operation.

Furthermore, as shown in FIG. 3B, a grasp sensor 33 (33a, 33b) is interposed between the handle bar 31 and each of the grips 32 to detect a user grasping the grip 32. A touch sensor such as a capacitive sensor or a pressure-sensitive sensor is favorably usable as the grasp sensor 33.

The grasp sensor 33 of the present embodiment, which includes a sensor 33a located on a side facing a palm (side facing a thumb) with the grip 32 grasped by a user and a sensor 33b corresponding to a side facing fingers (excluding the thumb), is allowed to reliably detect a grasped state by determining that it is in the grasped state if touch is detected by the sensors 33a, 33b on both sides and determining that a hand or a finger is merely placed on it if touch is detected only by one of them.

Next, description is made on a basic operation method in the walking aid vehicle mode.

In the walking aid vehicle mode, a shift from a normal control for a flat road with a road surface having an inclination less than a predetermined threshold to a control for an upslope or a control for a downslope is to be made in response to conditions of inclination of a road surface detected by the inclination sensor 20, etc. being satisfied and each control is different in the control of the drive motors 40L, 40R responsive to the operation of the operation part 3, etc. In the following, the basic normal control for a flat place is first described.

Normal Control

Forward movement: When a user pushes both the right and left grips 32 forward as shown by solid lines in FIG. 3A, and both the right and left operation amount sensors 30 detect forward pressures equal to or greater than a predetermined value, both the left and right drive motors 40L, 40R are rotated in a normal direction, causing the walking aid vehicle 1 to move forward to assist the user to walk forward. It is to be noted that the left and right drive motors 40L, 40R are basically rotated at the same rotation speed with a difference between the detection values of the right and left operation amount sensors 30 ignored.

Rearward movement: When a user pulls both the right and left grips 32 toward the user, as shown by dashed lines in FIG. 3A, and both the right and left operation amount sensors 30 detect rearward pressures equal to or greater than a predetermined value, both the left and right drive motors 40L, 40R are rotated in a reverse direction, causing the walking aid vehicle 1 to move rearward to assist the user to walk rearward. For the rearward movement, the left and right drive motors 40L, 40R are also rotated at the same rotation speed with a difference between the detection values of the right and left operation amount sensors 30 ignored.

Left forward turn: When a user pushes the right grip 32(R) forward as shown by solid lines in FIG. 3C, and the right operation amount sensor 30 detects a forward pressure equal to or greater than a predetermined value, only the right drive motor 40R is rotated in the normal direction, causing the walking aid vehicle 1 to perform left forward turn (TLa) around the still left driving wheel 4(L).

Left rearward turn: When a user pulls the left grip 32(L) toward the user as shown by dashed lines in FIG. 3C, and the left operation amount sensor 30 detects a rearward pressure equal to or greater than a predetermined value, only the left drive motor 40L is rotated in the reverse direction, causing the walking aid vehicle 1 to perform left rearward turn (TLb) around the still right driving wheel 4(R).

Left on-the-spot turn: When a user pulls the left grip 32(L) toward the user, as shown by the dashed lines in FIG. 3C, while the user pushes the right grip 32(R) forward as shown by the solid lines in FIG. 3C, and the left operation amount sensor 30 detects a rearward pressure equal to or greater than a predetermined value while the right operation amount sensor 30 detects a forward pressure equal to or greater than a predetermined value, the left drive motor 40L is rotated in the reverse direction while the right drive motor 40R is rotated in the normal direction, causing the walking aid vehicle 1 to perform leftward on-the-spot turn (TLs).

Right forward turn: When a user pushes the left grip 32(L) forward, as shown by solid lines in FIG. 3D, and the left operation amount sensor 30 detects a forward pressure equal to or greater than a predetermined value, only the left drive motor 40L is rotated in the normal direction, causing the walking aid vehicle 1 to perform right forward turn (TRa) around the still right driving wheel 4(R).

Right rearward turn: When a user pulls the right grip 32(R) toward the user, as shown by dashed lines in FIG. 3D, and the right operation amount sensor 30 detects a rearward pressure equal to or greater than a predetermined value, only the right drive motor 40R is rotated in the reverse direction, thus causing the walking aid vehicle 1 to perform right rearward turn (TRb) around the still left driving wheel 4(L).

Right on-the-spot turn: When a user pulls the right grip 32(R) toward the user, as shown by the dashed lines in FIG.

Figure 3D:
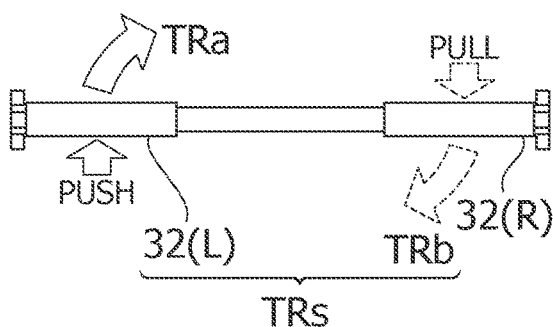
FIG. 3D is a plan view of the operation part showing a right-turn operation.

3D, while the user pushes the left grip 32(L) forward as shown by the solid lines in FIG. 3D, and the right operation amount sensor 30 detects a rearward pressure equal to or greater than a predetermined value while the left operation amount sensor 30 detects a forward pressure equal to or greater than a predetermined value, the right drive motor 40R is rotated in the reverser direction while the left drive motor 40L is rotated in the normal direction, thus causing the walking aid vehicle 1 to perform rightward on-the-spot turn (TRs).

Stop: When a user stops operation of pushing or pulling the right and left grips 32 or loosens the grasp of the right and left grips 32 or takes the hands off, and thus neither the right nor left operation amount sensor 30 detects a pressure equal to or greater than the predetermined value, the walking aid vehicle 1 stops on the spot.

Next, description is made on the control for an upslope in which an advance direction inclination of a pathway is equal to or greater than a predetermined threshold.

Figure 4:
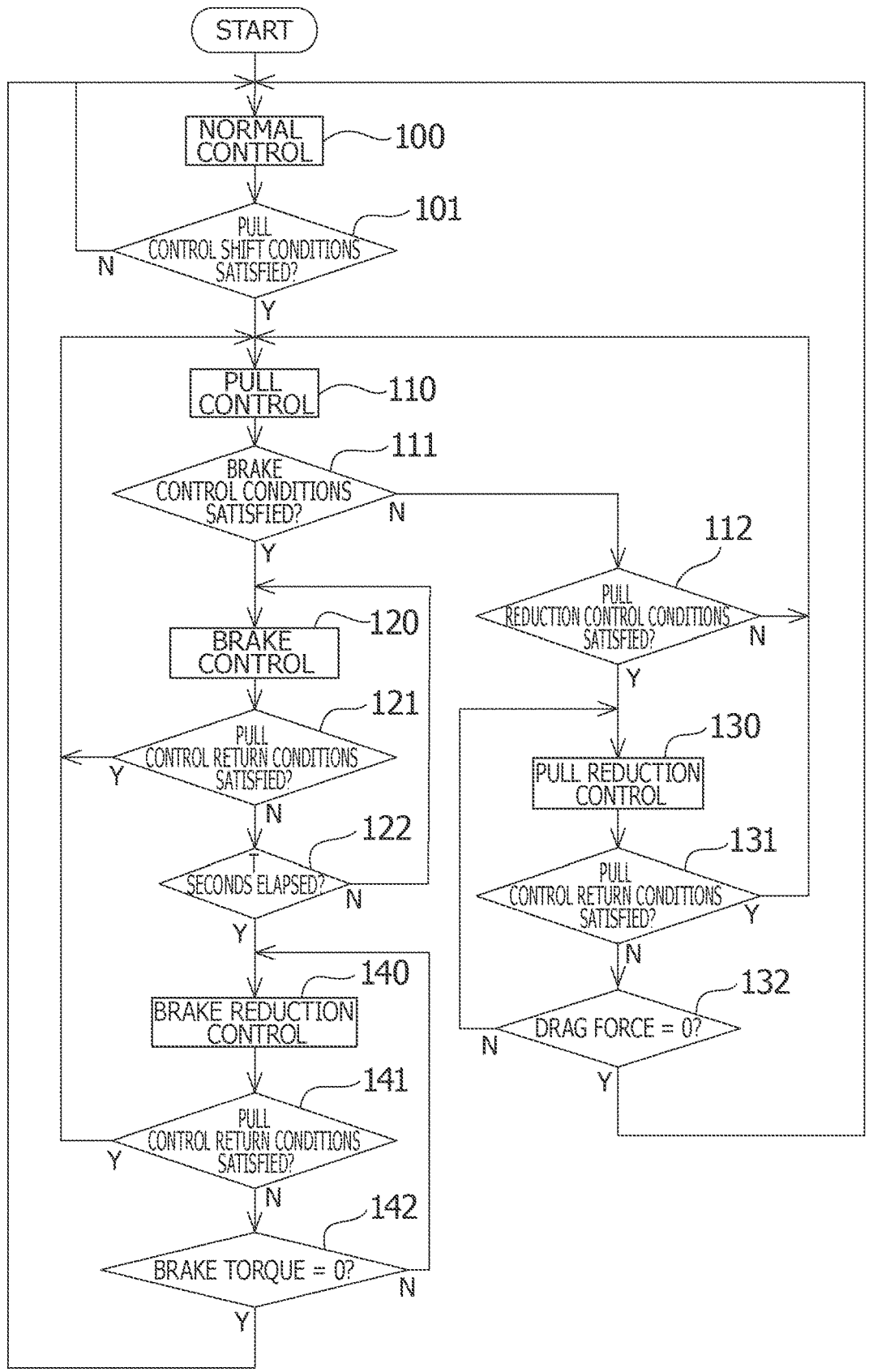
FIG. 4 is a flowchart showing a control of the walking aid vehicle for climbing a slope.
Figure 5:
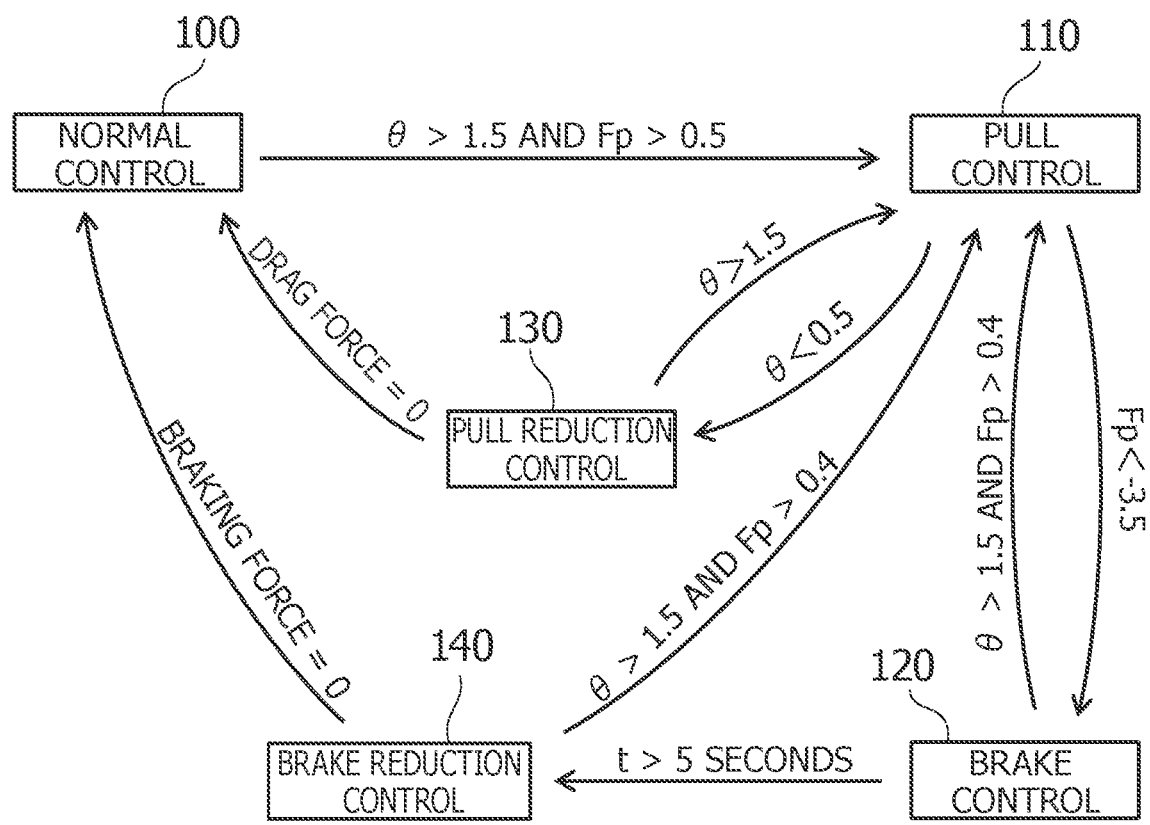
FIG. 5 is a block diagram showing an embodiment of the control of the walking aid vehicle for climbing a slope.

FIG. 4 is a flowchart showing a flow of a control in a case in which the normal control for a flat place shifts to the control for an upslope and FIG. 5 is a block diagram according to a first embodiment showing a corresponding transition of the control.

Pull Control

When predetermined pull control shift conditions are satisfied during a normal control 100, a shift to a pull control is made (step 101). For example, in a case in which an advance direction inclination detected by the inclination sensor 20 reaches or exceeds a threshold, when a user pushes the operation part 3 forward and the operation amount sensors 30 detect a forward pressure (operation force) equal to or greater than a predetermined value, the user is determined to express his or her intention to move forward, thus making a shift to a pull control 110 in which rotation characteristics of the drive motors 40L, 40R relative to an operation direction of the operation part 3 are inverted to generate a normal direction torque in the drive motors 40L, 40R.

Figure 9:
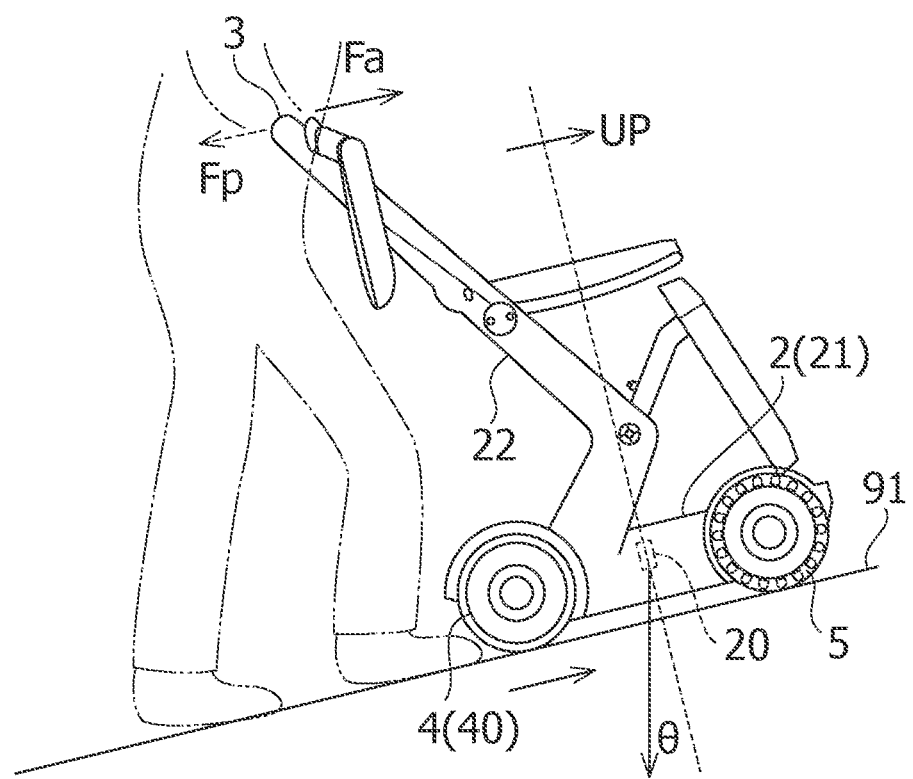
FIG. 9 is a side view showing travel of the walking aid vehicle on an upslope.

When the shift to the pull control 110 is made, a dragging target speed is initialized to a speed at that time, causing the walking aid vehicle 1 to move forward while dragging the user to assist upslope walking of the user. That is, as shown in FIG. 9, a thrust force Fa associated with the forward movement of the walking aid vehicle 1 allows for transferring the drag force to the user who grasps the operation part 3, an operation force Fp in a direction of pulling by the user is detected as a resulting reaction force by the operation part 3, and the drive of the drive motors 40L, 40R is controlled in accordance with this operation force Fp in a negative direction.

Figure 6:
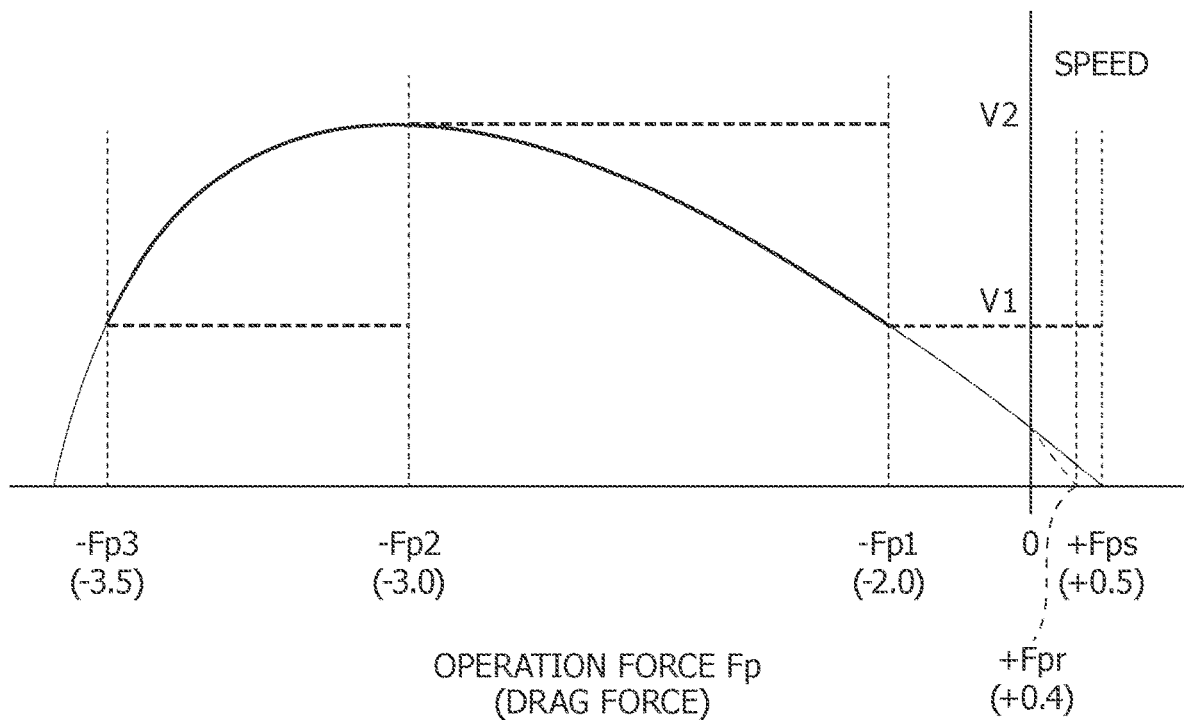
FIG. 6 is a graph showing operation force/speed characteristics during a pull control in climbing a slope with the walking aid vehicle.

FIG. 6 is a graph showing operation force (drag force)/speed characteristics during the pull control. In a case in which an advance direction inclination θ is equal to or greater than a threshold θ1 (for example, 1.5 degrees) and the operation force Fp of pushing the operation part 3 forward by a user reaches a first predetermined value +Fps (for example, 0.5 kg) or more, the rotation characteristics of the drive motors 40L, 40R relative to the operation direction of the operation part 3 are inverted, causing the walking aid vehicle 1 to start moving forward at a target speed V1 (for example, 1 km/h).

Subsequently, a dragging speed of the walking aid vehicle 1 is accelerated to a set speed V2 in accordance with the drag force (operation force) until an absolute value |−Fp| of the drag force to the user, that is, the operation force in the direction of pulling the operation part 3 by the user, reaches from a first predetermined value |−Fp1| (for example, −2.0 kg)| to a second predetermined value |−Fp2| (for example, −3.0 kg)| with the forward movement of the walking aid vehicle 1. Meanwhile, when the user reduces the operation force (absolute value) in the direction of pulling the operation part 3 by the user, the dragging speed is decelerated to an original target speed V1.

In the said control, the operation force |−Fp|, that is, the reaction force detected by the operation amount sensors 30 of the operation part 3 increases with an increase in the drag force to the user, so that the walking aid vehicle 1 is going to move ahead of the user, resulting in a tendency of increasing a distance between the user and itself.

Accordingly, in a case in which the absolute value of the drag force of the walking aid vehicle 1, or the operation force in the direction of pulling the operation part 3 by the user, reaches the second predetermined value |−Fp2| (for example, −3.0 kg)| or more, the dragging speed of the walking aid vehicle 1 is decelerated to the target speed V1 (for example, 1 km/h) in accordance with the drag force (operation force), reducing an increase in the distance between the walking aid vehicle 1 and the user.

Brake Control

While the pull control 110 as described above reduces an increase in the distance between the walking aid vehicle 1 and the user, a shift to a brake control is made when the distance from the user increases for some reason, satisfying predetermined brake control conditions (step 111). For example, when the distance between the user and the walking aid vehicle 1 increases and the operation force (drag force) in the direction of pulling the operation part 3 by the user reaches a third predetermined value |−Fp3| (for example, −3.5 kg)|, which is greater than the second predetermined value, or more, a shift to a brake control 120 is made.

In the brake control 120, feeding power to the drive motors 40L, 40R is stopped and regenerative braking is started to stop the walking aid vehicle 1, thereby preventing an increase in the distance from the user so that a proper distance from the walking aid vehicle 1 is restored by the walking of the user.

After the shift to the brake control 120, a return to the pull control is made when predetermined pull control return conditions are satisfied (step 121). For example, in a case in which the advance direction inclination is still equal to or greater than the threshold θ1 (for example, 1.5 degrees) after the shift to the brake control 120, the user is determined, responsive to detection of an operation force for pushing the operation part 3 equal to or greater than a predetermined value +Fpr, to express the user's intention to move forward, thus making a return to the pull control 110.

The predetermined value +Fpr, which is an operation force threshold of the pull control return conditions, is set at a value (for example, 0.4 kg) smaller than the predetermined value for the shift from the normal control 100 to the pull control 110 to make it possible to easily return to the pull control 110, thereby allowing for smoothly performing the pull control 110 in combination with the brake control 120.

Brake Reduction Control

Meanwhile, a shift to a brake reduction control 140 that reduces a braking force is made after the elapse of a predetermined duration of time (for example, five seconds) since the shift to the brake control 120 (step 122). In the brake reduction control 140, a braking torque for stopping the walking aid vehicle 1 is gradually decreased and the return to the normal control 100 is made when the braking torque reaches a predetermined value or less or reaches zero (step 142).

During the brake reduction control 140, if the advance direction inclination is still equal to or greater than the threshold θ1 (for example, 1.5 degrees) and the operation force +Fpr for pushing the operation part 3 equal to or greater than the predetermined value is detected, a return to the pull control 110 is made (step 141). It is preferable that the predetermined value +Fpr, that is, an operation force threshold of the pull control return conditions, in this case be also set at a smaller value (for example, 0.4 kg) than in a case in which a shift from the normal control 100 to the pull control 110 is made as described above, allowing for easily returning to the pull control 110.

Pull Reduction Control

Meanwhile, during the pull control 110 described above, a shift to the pull reduction control is made when predetermined pull reduction control shift conditions are satisfied (step 112). For example, when the advance direction inclination becomes less than a second threshold θ2 (for example, 0.5 degrees), which is smaller than the threshold θ1 of inclination for the shift from the normal control 100 to the pull control 110 described above, during the pull control 110, a shift to a pull reduction control 130 that gradually decreases a normal direction torque generated in the drive motors 40L, 40R is made.

As such, a shift to the pull reduction control 130 is made in response to a reduction in the advance direction inclination, thereby allowing prevention of the pull control 110 being interrupted due to a temporary reduction in the inclination or the like and, furthermore, the drag force is gradually decreased, thereby allowing for a smooth return with less torque variation when a return to the normal control 100 is made in response to the drag force (the operation force in the pulling direction) reaching zero or the predetermined level or less (step 132).

Meanwhile, when the predetermined pull control return conditions are satisfied after the shift to the pull reduction control 130, a return to the pull control is made (step 131). For example, when the advance direction inclination reaches the inclination θ1 (for example, 1.5 degrees) of the pull control shift conditions described above or more during the pull reduction control 130, a return to the pull control 110 is made.

Furthermore, the threshold θ2 (0.5 degrees) of inclination of the pull reduction control shift conditions is set at a value smaller than the threshold θ1 (1.5 degrees) of the pull control shift conditions, thereby allowing for preventing the pull control 110 from being frequently interrupted due to a temporary reduction in the inclination or the like.

Figure 10:
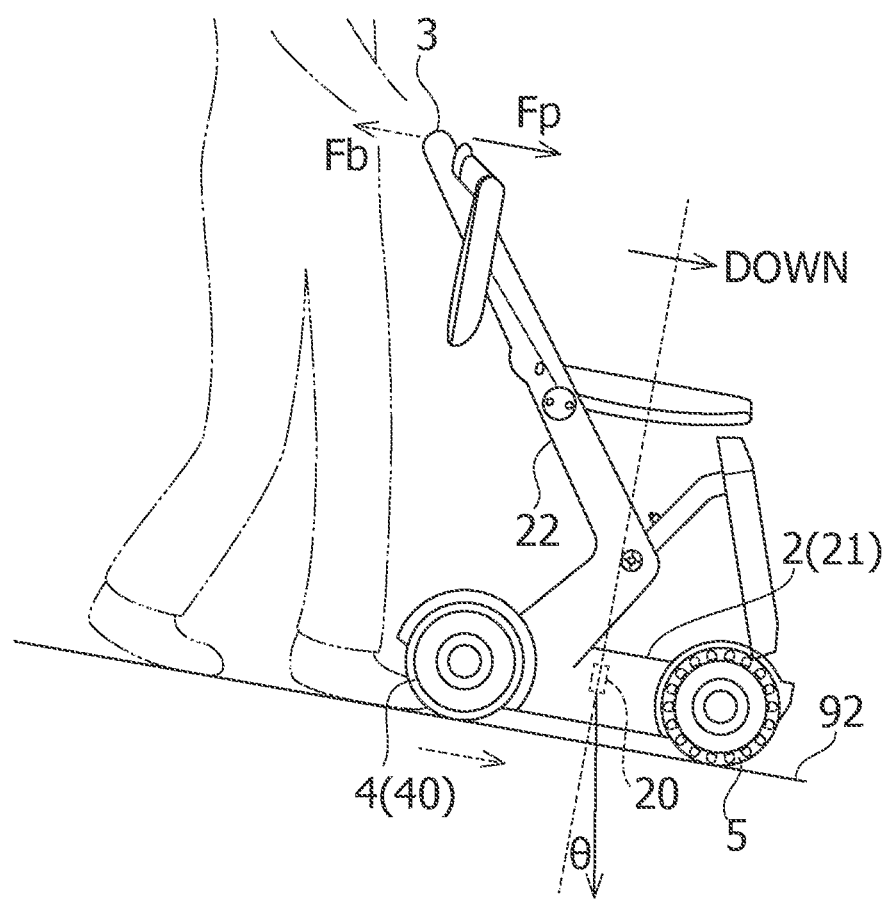
FIG. 10 is a side view showing travel of the walking aid vehicle on a downslope.

While description has been made above regarding control for an upslope, a reverse direction torque is generated in the drive motors 40L, 40R in travelling on a downslope 92 as shown in FIG. 10, applying a braking force Fb (regenerative electric power) opposite to a pushing force Fp of the user to assist in braking the user.

Figure 7:
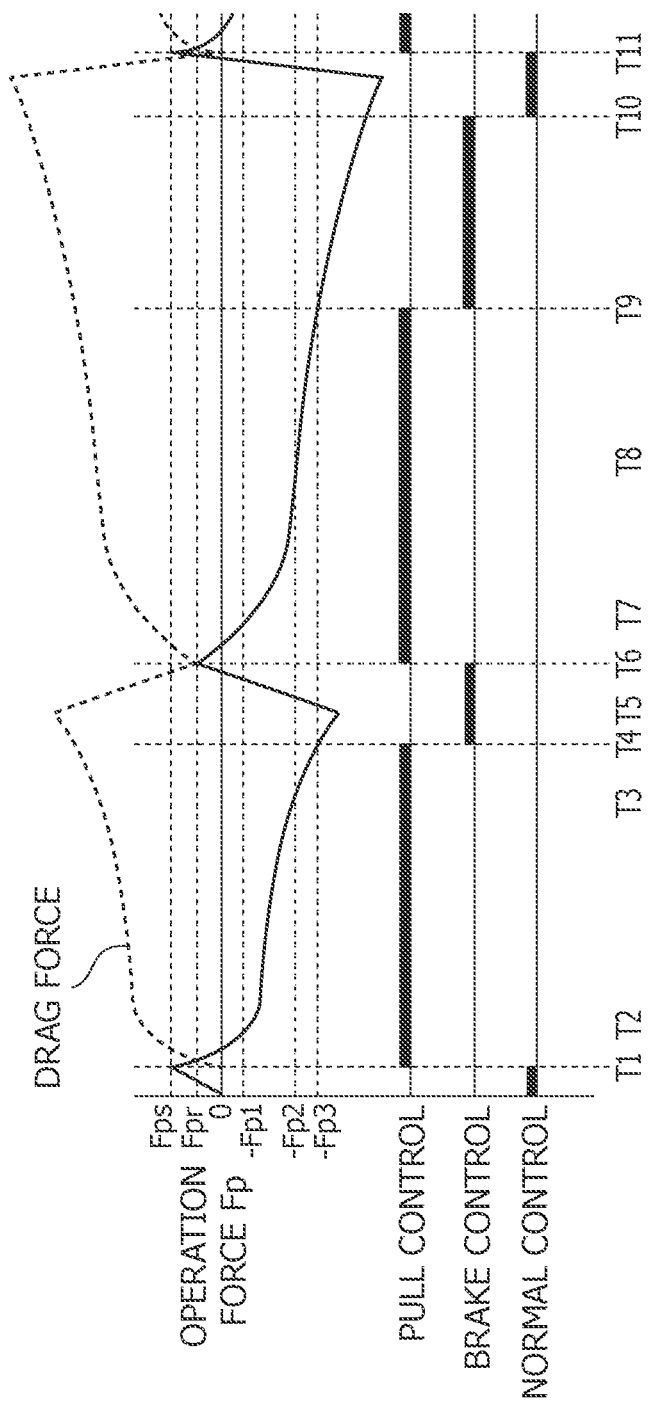
FIG. 7 is a timing chart showing one embodiment of the control of the walking aid vehicle.

Next, FIG. 7 is a timing chart showing one embodiment of the control of the walking aid vehicle 1, in which in a stopped state (normal control) on an upslope with an advance direction inclination equal to or greater than the threshold θ1, the rotation characteristics of the drive motors 40L, 40R relative to an operation direction of the operation part 3 are inverted at a time T1 when a user pushes the operation part 3 forward and the operation force of the predetermined value +Fps is detected, making a shift to the pull control that generates a normal direction torque in the drive motors 40L, 40R responsive to the operation force in the direction of pulling the operation part 3.

When the shift to the pull control is made, the thrust force Fa of the walking aid vehicle 1 causes drag force to be transferred to the user who grasps the operation part 3 as shown by dashed lines in the figure, the operation force −Fp in the direction of pulling by the user is detected as the resulting reaction force by the operation part 3, and the drive motors 40L, 40R are controlled in accordance with this negative direction operation force −Fp.

Afterward, from times T2 to T3, the operation force (drag force) increases while the user is dragged and deceleration is caused at the time T3 and later, but a shift to the brake control is made when the distance to the user increases with the operation force exceeding the threshold −Fp3 at a time T4. A braking force is thus applied, narrowing the distance to the user and causing, at a time T5, the operation force (drag force) to decrease.

Subsequently, an operation force Fpr (<Fps) is detected as a result of pushing the operation part 3 by the user and a return to the pull control is made at a time T6, causing the walking aid vehicle 1 to restart dragging with the thrust force Fa. Afterward, although a shift to the brake control is made at a time T9 in a similar manner as described above, even when the walking aid vehicle 1 is stopped after the shift, a return to normal control is made at a time T10 if a predetermined duration of time T (five seconds) elapses without a reduction in the operation force (drag force). In a case in which the return to the normal control is made once, a shift to the pull control is to be made at a time T11 when an operation force Fps is detected as a result of pushing the operation part 3 by the user.

As described above, in the control for an upslope, the pull control, which is associated with the speed control of the walking aid vehicle 1, allows a user to be dragged and, in a case in which the distance between the walking aid vehicle 1 and the user increases, the brake control allows the walking aid vehicle 1 to be decelerated or stopped to restore a proper distance from the user, thus allowing for assisting upslope walking of the user by virtue of the combined use of the pull control and the brake control.

It is to be noted that in the pull control as described above, which is intended to assist a user to walk forward on an upslope, the right and left drive motors 40L, 40R are basically rotated at the same rotation speed with a difference between the detection values of the right and left operation amount sensors 30 ignored as in a case of a flat road. Since the user is to be dragged by the thrust force Fa of the walking aid vehicle 1, it is assumed that the user grasps both the operation parts 3 and the walking aid vehicle 1 is stopped when either one of the right or left (or both) hand is released from the operation part 3.

In a case in which a change in the advance direction is needed during the pull control on an upslope, the operation part 3 is pulled to make a shift to the brake control or the grasp is loosen to temporarily make a return to the normal control and perform one of the operations including the above described right or left forward turn, right or left rearward turn, and right or left on-the-spot turn on a flat road and, after a change in the direction, a shift to the pull control is made by pushing the operation part forward (as long as an inclination equal to or greater than the threshold θ1 is still detected).

Figure 8:
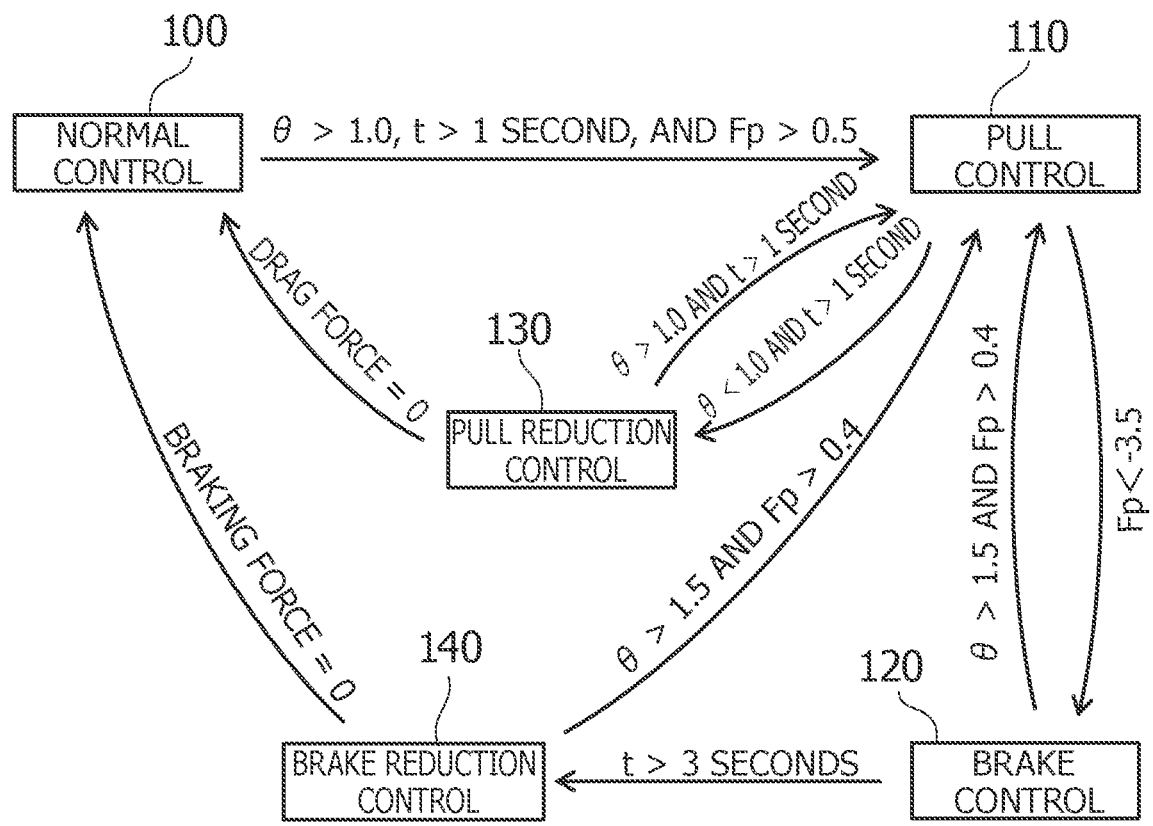
FIG. 8 is a block diagram showing another embodiment of the control of the walking aid vehicle.

Next, FIG. 8 is a block diagram according to a second embodiment showing transition of the control for an upslope, in which a basic configuration is similar to that of the first embodiment, so that common numerals are used to refer to common elements to omit the explanation thereof and description is made below mainly on changes.

Pull Control

While only the advance direction inclination and the advance direction operation by a user are detected as the pull control shift conditions in the first embodiment, duration of continuation of a state in which the advance direction inclination is equal to or greater than the threshold is added to the conditions in the second embodiment, thus setting an inclination threshold at a smaller value. That is, in case in which, although the inclination is small, the inclination has duration of continuation, it is determined to require the pull control.

For example, when a predetermined duration of time (for example, one second) elapses in a state in which the advance direction inclination detected by the inclination sensor 20 is equal to or greater than a third threshold θ3 (for example, 1.0 degree), which is smaller than the threshold θ1 (1.5 degrees) in the first embodiment, and the operation force of pushing the operation part 3 by a user reaches the first predetermined value +Fps (for example, 0.5 kg) or more, a shift to the pull control 110 is made.

Brake Reduction Control

While the predetermined duration of time since the shift to the brake control 120 is five seconds in the first embodiment, a shift to the brake reduction control 140 is made after the elapse of a predetermined duration of time (for example, three seconds) shorter than it in the second embodiment.

Pull Reduction Control

While only a case in which the advance direction inclination becomes less than the threshold is detected as the pull reduction control shift conditions in the first embodiment, duration of continuation of a state in which the advance direction inclination is less than the threshold is added to the conditions in the second embodiment, thus setting the inclination threshold at a greater value. That is, if a reduction in the inclination is small but has duration of continuation, probability of a situation requiring reducing the pull control 110 is determined to be high.

For example, if a predetermined duration of time (for example, one second) elapses in a state in which the advance direction inclination detected by the inclination sensor 20 is less than the third threshold θ3 (for example, 1.0 degree), which is greater than the second threshold θ2 (0.5 degrees) in the first example, a shift to the pull reduction control 130 is made.

Likewise, duration of continuation of a state in which the advance direction inclination is equal to or greater than the threshold is added to the pull control return conditions as described above, thus setting the inclination threshold at a smaller value. That is, if an increase in the inclination is small but has duration of continuation, probability of a situation requiring a return to the pull control 110 is determined to be high. In this case, the inclination threshold of the pull control return conditions may be set at the same value θ3 (for example, 1.0 degree) as that of the pull reduction control shift conditions or may be a different value.

As such, in determining an inclination of an upslope and an operation by a user, a state in which the inclination is reached and duration of continuation of the operation are taken into consideration, thereby allowing the prevention of excessive control being performed due to a local variation in the inclination, an unintended operation, or the like to stabilize the control.

Although the embodiment of the present invention has been described above, the present invention is not limited to the embodiment, and a variety of further modifications and alterations are possible on the basis of a technical concept of the present invention.

Figure 3E:
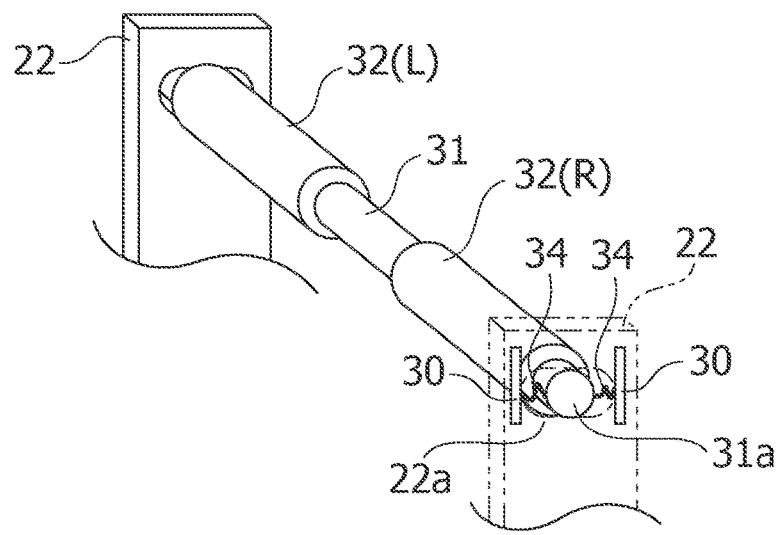
FIG. 3E is a perspective view of the operation part.

For example, although a case in which a load sensor interposed between the support body 31a of each of the right and left handle bars 31 and the support hole 22a of the upper frame 22 is used as the operation amount sensor 30 is given in the embodiment, as shown in FIG. 3E, the support hole 22a of the upper frame 22 may be in the form of an elongated hole (guide slot) in a vehicle forward-backward direction, allowing the support body 31a on each of the right and left sides of the handle bar 31 to slide back and forth along the elongated hole (22a), while the operation amount sensor 30 (pressure sensor) is disposed on each of front and back sides of the support body 31a (slider) with a spring 34 placed in between.

Furthermore, although a case in which the operation part 3 includes the right and left integrated handle bar 31 provided with the right and left grips 32 and operation amount sensors 30 is given in the embodiment, independent right and left handles may be provided with the respective grips 32 and operation amount sensors 30 and, in this case, the handles can be supported in a cantilever manner or rotatably supported independently on the right and left sides in such a manner to receive an operation reaction force.

Furthermore, although a case in which the walking aid vehicle 1 has the compact electric vehicle mode is described in the embodiment, the present invention may be implemented as a walking aid vehicle not having the compact electric vehicle mode.

Moreover, although a case in which omni wheels (omni-directional wheels) are used as the trailing wheels 5 is given in the embodiment, trailing wheels in the form of a non-omni wheel steerably supported in a caster manner or the like may be used.

What is claimed is:

1. A walking aid vehicle comprising:
a vehicle body having a forward-backward direction and a width direction;
driving wheels being driven by a drive motor mounted on the vehicle body;
trailing wheels provided away from the driving wheels in the forward-backward direction of the vehicle body;
an operation part provided on an upper portion of the vehicle body to be grasped by a user in a walking posture;
means for detecting an operation force applied to the operation part; and
inclination detection means for detecting an inclination of the vehicle body,
wherein when an advance direction inclination detected by the inclination detection means is less than a threshold, a normal control is performed, the normal control generating a normal direction torque in the drive motor responsive to an operation of pushing the operation part forward and generating a reverse direction torque in the drive motor responsive to an operation of pulling the operation part rearward; and
when the advance direction inclination detected by the inclination detection means is equal to or greater than the threshold and the operation of pushing the operation part forward is detected, a shift to a pull control is made, the pull control generating the normal direction torque in the drive motor responsive to an operation force for pulling the operation part.

2. The walking aid vehicle according to claim 1, wherein the shift to the pull control is made when the advance direction inclination detected by the inclination detection means reaches a first threshold or more and an operation force for pushing the operation part forward reaches a first predetermined value or more, and deceleration is caused when the operation force for pulling the operation part reaches a second predetermined value or more during the pull control.

3. The walking aid vehicle according to claim 2, wherein a shift to a brake control is made when the operation force for pulling the operation part reaches a third predetermined value greater than the second predetermined value or more during the pull control, and a return to the pull control is made when the operation force for pushing the operation part is detected.

4. The walking aid vehicle according to claim 3, wherein a shift to a brake reduction control that reduces a braking force is made after an elapse of a predetermined duration of time since the shift to the brake control, and a return to the normal control is made when the braking force reaches a predetermined level or less.

5. The walking aid vehicle according to claim 3, wherein when the advance direction inclination detected by the inclination detection means reaches the first threshold or more and the operation force for pushing the operation part is detected during the brake reduction control, the return to the pull control is made.

6. The walking aid vehicle according to claim 2, wherein when the advance direction inclination detected by the inclination detection means becomes less than a second threshold less than the first threshold during the pull control, a shift to a pull reduction control that gradually reduces the normal direction torque generated in the drive motor is made.

7. The walking aid vehicle according to claim 6, wherein when the advance direction inclination detected by the inclination detection means reaches the first threshold or more during the pull reduction control, a return to the pull control is made.

8. The walking aid vehicle according to claim 6, wherein when the normal direction torque generated in the drive motor reaches zero during the pull reduction control, a return to the normal control is made.

9. The walking aid vehicle according to claim 1, wherein the shift to the pull control is made when a predetermined duration of time elapses in a state in which the advance direction inclination detected by the inclination detection means is a third threshold or more and an operation force for pushing the operation part reaches a first predetermined value or more, and deceleration is caused when the operation force for pulling the operation part reaches a second predetermined value or more during the pull control.

10. The walking aid vehicle according to claim 9, wherein when a predetermined duration of time elapses in a state in which the advance direction inclination detected by the inclination detection means is less than the third threshold during the pull control, a shift to a pull reduction control that gradually reduces the normal direction torque generated in the drive motor is made.

11. The walking aid vehicle according to claim 10, wherein when a predetermined duration of time elapses in a state in which the advance direction inclination detected by the inclination detection means is equal to or greater than the third threshold during the pull reduction control, a return to the pull control is made.

12. The walking aid vehicle according to claim 1, wherein the vehicle body includes a foldable seat and a second operation part to be operated by a user seated on the seat and the walking aid vehicle is usable also as a compact electric vehicle.

* * * * *